US012329694B1

(12) United States Patent
Bethany et al.

(10) Patent No.: US 12,329,694 B1
(45) Date of Patent: Jun. 17, 2025

(54) KEEPSAKE STORAGE METHOD AND APPARATUS

(71) Applicant: Orbs & Keepsakes, LLC, Roswell, NM (US)

(72) Inventors: Jerel Bethany, Roswell, NM (US); Brett Bethany, Huntsville, AR (US)

(73) Assignee: Orbs & Keepsakes, LLC, Roswell, NM (US)

( * ) Notice: Subject to any disclaimer, the term of this patent is extended or adjusted under 35 U.S.C. 154(b) by 37 days.

(21) Appl. No.: 18/229,138

(22) Filed: Aug. 1, 2023

Related U.S. Application Data

(60) Provisional application No. 63/394,232, filed on Aug. 1, 2022.

(51) Int. Cl.
*A61G 17/08* (2006.01)

(52) U.S. Cl.
CPC .................................... *A61G 17/08* (2013.01)

(58) Field of Classification Search
CPC .............................. A61G 17/08; E04H 13/008
See application file for complete search history.

(56) References Cited

U.S. PATENT DOCUMENTS

D87,058 S 5/1932 Hall
2,196,486 A 4/1940 Anderson
D130,586 S 12/1941 Parsil, Jr.
D136,501 S 10/1943 Habif
2,361,423 A 10/1944 Snyder
2,575,283 A 11/1951 Menrath
3,122,256 A 2/1964 Orr
3,244,313 A 4/1966 Wayne
3,264,789 A 8/1966 Duesenberg
3,283,136 A 11/1966 Dinkler et al.
D213,150 S 1/1969 McBain
D223,505 S 4/1972 Ott
3,730,383 A 5/1973 Dunn et al.
3,905,509 A 9/1975 Markowitz
D237,853 S 12/1975 Katz
3,990,166 A 11/1976 Nagelkirk
(Continued)

FOREIGN PATENT DOCUMENTS

CN 2785582 Y 6/2006
CN 202154830 U 3/2012
(Continued)

OTHER PUBLICATIONS

"About Madelyn Jewelry—The Original Keepsake Pendant", http://www.memorialjewellery.com.au Downloaded Apr. 8, 2016.
(Continued)

*Primary Examiner* — William L Miller
(74) *Attorney, Agent, or Firm* — Peacock Law P.C.; Justin R. Jackson; Daniel Berenger-Russell

(57) ABSTRACT

A method and apparatus for storing cremains in a decorative object in such a way that it is not readily apparent that the object contains cremains stored therein. The cremains can be placed into a first container and retained therein by a lid that can be attached. The first container can be disposed into a recess that is formed in a bottom of the decorative object such that when the decorative object is placed in its intended resting configuration on an opaque surface, the inner container is not observable and is thus hidden from view.

18 Claims, 21 Drawing Sheets

(56) References Cited

U.S. PATENT DOCUMENTS

D244,473 S 5/1977 Karl
D256,993 S 9/1980 Strand
4,324,026 A 4/1982 Craft
D269,359 S 6/1983 Yoshimura et al.
D272,722 S 2/1984 Haakenson
4,429,798 A 2/1984 Borows
4,502,298 A 3/1985 Benton
D284,842 S 7/1986 McEvoy
4,601,403 A 7/1986 Pollitz
D289,355 S 4/1987 Paulides
4,727,299 A 2/1988 Liu
4,961,276 A 10/1990 Lin
D315,095 S 3/1991 Wright
D322,753 S 12/1991 Sussman
5,137,162 A 8/1992 Fritz
5,208,957 A 5/1993 Hereford
5,224,615 A 7/1993 Hickerson
5,379,499 A 1/1995 Jackson
D355,605 S 2/1995 Newson et al.
5,406,728 A 4/1995 Willitts
D358,115 S 5/1995 Rahr
D375,411 S 11/1996 Hawkins
5,666,750 A 9/1997 Segan et al.
5,706,973 A 1/1998 Robbins et al.
D393,016 S 3/1998 Young
5,755,116 A 5/1998 Sparacino et al.
D405,699 S 2/1999 Chae
D406,243 S 3/1999 Ricci
5,903,961 A * 5/1999 Parker .................. A61G 17/007 27/1
5,950,287 A 9/1999 Cacciatore et al.
D416,173 S 11/1999 Hersch
6,023,822 A * 2/2000 Luebke .................. A63H 3/005 27/1
D422,218 S 4/2000 Ohchi et al.
D423,360 S 4/2000 Togasawa et al.
D426,789 S 6/2000 Joergensen
D446,814 S 8/2001 Lau
6,385,880 B1 5/2002 Naragon
D461,097 S 8/2002 Nemirovsky
6,516,556 B1 2/2003 Rigler
6,520,361 B2 2/2003 Joulia
6,564,483 B1 5/2003 Hsu
6,568,108 B2 5/2003 Lin
6,612,053 B2 9/2003 Liao
D499,336 S 12/2004 Flecheux
6,848,206 B2 2/2005 Zhao
6,857,929 B2 2/2005 Liao et al.
D505,075 S 5/2005 Dragon et al.
D519,322 S 4/2006 Hutton
7,065,908 B1 6/2006 Pineda-Sanchez et al.
D530,218 S 10/2006 Burkemper
D530,572 S 10/2006 Daams
D531,452 S 11/2006 Toth
D533,064 S 12/2006 Glynn et al.
7,191,498 B2 3/2007 Fischer
D542,707 S 5/2007 Kolokotronis et al.
7,228,602 B2 6/2007 Weisbrot et al.
7,370,394 B1 * 5/2008 Juneau ..................... A01N 1/00 27/1
D574,710 S 8/2008 Gangrade
D582,724 S 12/2008 Dretzka
7,467,444 B1 12/2008 Johnson, Sr.
7,469,794 B2 12/2008 Krueger
7,562,423 B2 7/2009 Pryd-Kakuk
7,610,663 B2 11/2009 Johnson, Sr.
7,617,624 B1 11/2009 Chen
D610,907 S 3/2010 Robillard et al.
D611,346 S 3/2010 Camomile
D614,033 S 4/2010 Hassamanci
D626,417 S 11/2010 Kim
7,861,385 B1 1/2011 Meyer
7,950,117 B2 5/2011 Elhaj
D639,205 S 6/2011 Harshman
D639,661 S 6/2011 Llerena
D639,662 S 6/2011 Riguzzi
D641,591 S 7/2011 Tsukida
7,997,100 B2 8/2011 Fossas
D648,984 S 11/2011 Gullickson et al.
D652,722 S 1/2012 Robertson et al.
8,125,774 B2 2/2012 Kelley et al.
D660,195 S 5/2012 Harshman
D662,441 S 6/2012 Harshman
8,281,465 B1 10/2012 Miraldi
D671,295 S 11/2012 Anthony
D675,105 S 1/2013 Chen
D681,381 S 5/2013 Ratzmann
D693,688 S 11/2013 Russell et al.
8,627,555 B2 1/2014 Kennedy
D703,913 S 4/2014 Irvine et al.
D710,743 S 8/2014 Bartter
D719,448 S 12/2014 Pires et al.
8,960,937 B2 2/2015 Yang
D731,685 S 6/2015 Young
D781,655 S 3/2017 Koch et al.
D784,138 S 4/2017 Kim et al.
D786,605 S 5/2017 Bodum
D788,636 S 6/2017 Paternostre et al.
D795,699 S 8/2017 Vivas
D798,666 S 10/2017 Koch et al.
D798,667 S 10/2017 Koch et al.
9,775,760 B1 * 10/2017 Roy ....................... A61G 17/08
9,827,158 B1 * 11/2017 Roy ....................... A61G 17/08
D830,034 S 10/2018 Walas
D833,227 S 11/2018 Kehrein
D836,879 S 12/2018 Singh
D847,638 S 5/2019 Moretti
D848,703 S 5/2019 Reynolds et al.
D849,540 S 5/2019 Robinson et al.
D855,190 S 7/2019 Wu et al.
D859,087 S 9/2019 Tarbutton
D860,577 S 9/2019 Reynolds et al.
D860,578 S 9/2019 Reynolds et al.
10,517,360 B1 12/2019 Bethany
D885,190 S 5/2020 Chen et al.
D896,123 S 9/2020 Fernandez
D903,224 S 11/2020 Reynolds et al.
D905,925 S 12/2020 Koekkoek
D913,099 S 3/2021 Babcock
D915,023 S 3/2021 Sengupta
D923,285 S 6/2021 Reynolds et al.
D935,728 S 11/2021 Rietveld
D938,689 S 12/2021 Granger Duits
D942,858 S 2/2022 Chen et al.
D961,319 S 8/2022 Keeley et al.
11,458,059 B2 * 10/2022 Bell ....................... A61G 17/08
11,602,234 B1 * 3/2023 Fort ....................... A61G 17/08
D992,855 S 7/2023 Yue
D1,005,171 S 11/2023 Zou
D1,027,358 S 5/2024 Bethany et al.
D1,028,413 S 5/2024 Bethany et al.
2003/0014889 A1 1/2003 Zhao
2004/0040129 A1 * 3/2004 Ogle, II ............... A61G 17/007 27/1
2004/0045316 A1 3/2004 Naor
2004/0055190 A1 3/2004 Liu
2004/0198225 A1 10/2004 Levinsohn
2005/0092023 A1 5/2005 Camargo et al.
2005/0120525 A1 * 6/2005 Heil ....................... A61G 17/08 27/1
2005/0279136 A1 12/2005 Bowman
2006/0207075 A1 9/2006 Davis
2006/0266079 A1 11/2006 Lavictoire
2007/0080077 A1 4/2007 Thormahlen
2009/0266108 A1 10/2009 Balme et al.
2010/0199476 A1 8/2010 Cummings et al.
2010/0275649 A1 11/2010 Eggleston
2011/0017698 A1 1/2011 Escobar et al.
2011/0099778 A1 * 5/2011 Johnson ................. A61G 17/08 27/1
2011/0132036 A1 6/2011 Meltzer
2011/0277502 A1 11/2011 Welikson
2012/0137560 A1 6/2012 Denton et al.
2014/0268866 A1 9/2014 Yang

(56) References Cited

U.S. PATENT DOCUMENTS

| | | | | |
|---|---|---|---|---|
| 2015/0052946 | A1 | 2/2015 | Reid, II | |
| 2015/0209211 | A1 | 7/2015 | Savage | |
| 2016/0016700 | A1 | 1/2016 | Stevens | |
| 2017/0107027 | A1 | 4/2017 | Sangiovanni | |
| 2018/0085273 | A1 | 3/2018 | Laurens et al. | |
| 2019/0231628 | A1 | 8/2019 | Reynolds et al. | |
| 2021/0378901 | A1 | 12/2021 | Bell et al. | |
| 2024/0156663 | A1 * | 5/2024 | Miller | G07C 9/00896 |
| 2024/0335345 | A1 * | 10/2024 | Xiang | A61G 17/08 |

FOREIGN PATENT DOCUMENTS

| | | | |
|---|---|---|---|
| CN | 202459163 | U | 10/2012 |
| CN | 308679346 | | 6/2024 |
| DE | 10001506 | B4 | 7/2006 |
| GB | 6328996 | | 11/2023 |
| KR | 20170056947 | A | 5/2017 |
| TW | M412759 | U | 10/2011 |
| TW | M413485 | U | 10/2011 |

OTHER PUBLICATIONS

"Cremation Ash Photo Memorial Keepsake", http://www.etsy.com/in-en/listing/173942878/cremation-ash-photo-memorial-keepsakes?ref=market Downloaded Mar. 31, 2014.

Cremation Jewelry Designs , "Star Seed Gems", http://www.starseedgems.com Downloaded Apr. 8, 2016.

"EBay Bud Vase", Retrieved from internet, https://www.ebay.com/itm/265736097934, Jul. 26, 2024, 1.

"OfferUp Shot Glass", Retrieved from internet, https://offerup.com/item/detail/69f18196-ad32-3254-a539-9cd08115d064, Jul. 26, 2024, 1.

"Sin Wings Store Vase", Retrieved from internet, https://www.amazon.com/Flower-Ceramic-Centerpiece-Flowers-Stylish/dp/B0C23PKZJW?th=1, Jul. 26, 2024, 2023, 1-2.

* cited by examiner

KEEPSAKE STORAGE METHOD AND APPARATUS

CROSS-REFERENCE TO RELATED APPLICATIONS

This application claims priority to and the benefit of the filing of U.S. Provisional Patent Application No. 63/394,232, entitled "Keepsake Storage Method and Apparatus", filed on Aug. 1, 2022, and the specification thereof is incorporated herein by reference.

BACKGROUND OF THE INVENTION

Embodiments of the present invention relate to a keepsake storage method and apparatus that can optionally be used to store cremains. More particularly, embodiments of the present invention relate to a decorative and/or utilitarian object which is configured to store a memento within it. Optionally, the keepsake can store the memento such that it is not readily apparent that a memento is stored within the keepsake.

BRIEF SUMMARY OF EMBODIMENTS OF THE PRESENT INVENTION

Embodiments of the present invention relate to a cremains container having a first container which itself includes a lid, the lid configured to be retained in a closed position when the first container is inverted; a decorative object, the decorative object comprising a recess formed or otherwise disposed in a bottom thereof, the recess comprising a shape and size which allow the first container to be at least partially disposed therein; an adhesive disposed within the recess and positioned to attach the first container within the recess of the decorative object; and the cremains container comprising a shape such that no portion of the first container is visible when the bottom of the cremains container is placed upon an opaque surface or on an opaque supporting base.

In one embodiment, a first opening can be disposed in the lid and a second opening can be disposed within the container such that the first opening and the second opening can be aligned when the lid is disposed, in a closed configuration, on the first container. The lid can be configured to be retained in a closed position by a fastener disposed through the first opening and at least partially within the second opening. The first container can have cremains disposed therein. The lid can be retained in a closed position on the first container by a plurality of fasteners. The decorative object can include wood and hardened epoxy which has been shaped by turning on a lathe.

Optionally, the cremains container can also include a removably positionable base. The first container can be disposed within the decorative object such that when the decorative object is inverted with its bottom facing upward, the lid of the inner container is observable. The recess can have a depth such that when the first container is fully seated therein, with the lid disposed onto the first container, the first container, including the lid is recessed with respect to a bottom surface of the decorative object. The inner container can have an opening disposed in a bottom thereof.

Embodiments of the present invention also relate to a method for storing cremains, the method including obtaining cremains, providing a decorative object comprising a bottom which faces downward when the decorative object is placed in its intended resting orientation, disposing cremains within a first container, securing a lid onto the first container, disposing the first container at least partially into a recess formed into a bottom of the decorative object, and securing the first container within the recess with an adhesive. The decorative object can be formed from a mass of wood and hardened epoxy that has been shaped by turning the mass on a lathe. The lid can be secured to the first container via one or more fasteners.

Optionally, the lid can be secured to the first container by passing at least one fastener through an opening disposed in the lid and disposing an end portion of the fastener into an opening formed in the first container. Optionally, disposing the first container at least partially into a recess formed into a bottom of the decorative object can include placing the inner container into the recess such that the lid of the first container is observable when the decorative object is positioned such that a user can observe a bottom surface of the decorative object. The method can also include placing the decorative object onto a base after the cremains have been disposed within the inner container and after the inner container, with the lid, has been disposed into the recess of the decorative object.

In one embodiment, the recess and the inner container can each comprise a substantially circular cross-sectional shape. The recess and the inner container can each comprise a substantially rectangular cross-sectional shape. Optionally, disposing the first container at least partially into a recess formed into a bottom of the decorative object can include disposing the first container into the recess such that the first container and the lid thereof are recessed with respect to the bottom of the decorative object such that when the decorative object is placed onto a flat surface, the bottom of the decorative object contacts the flat surface and no portion of the first container, including its lid, contacts the flat surface. The step of securing the first container within the recess with an adhesive can include disposing a liquid adhesive within the recess and forcing the first container into the recess while allowing some of the adhesive to escape through an opening that is formed into a bottom of the first container.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1A:
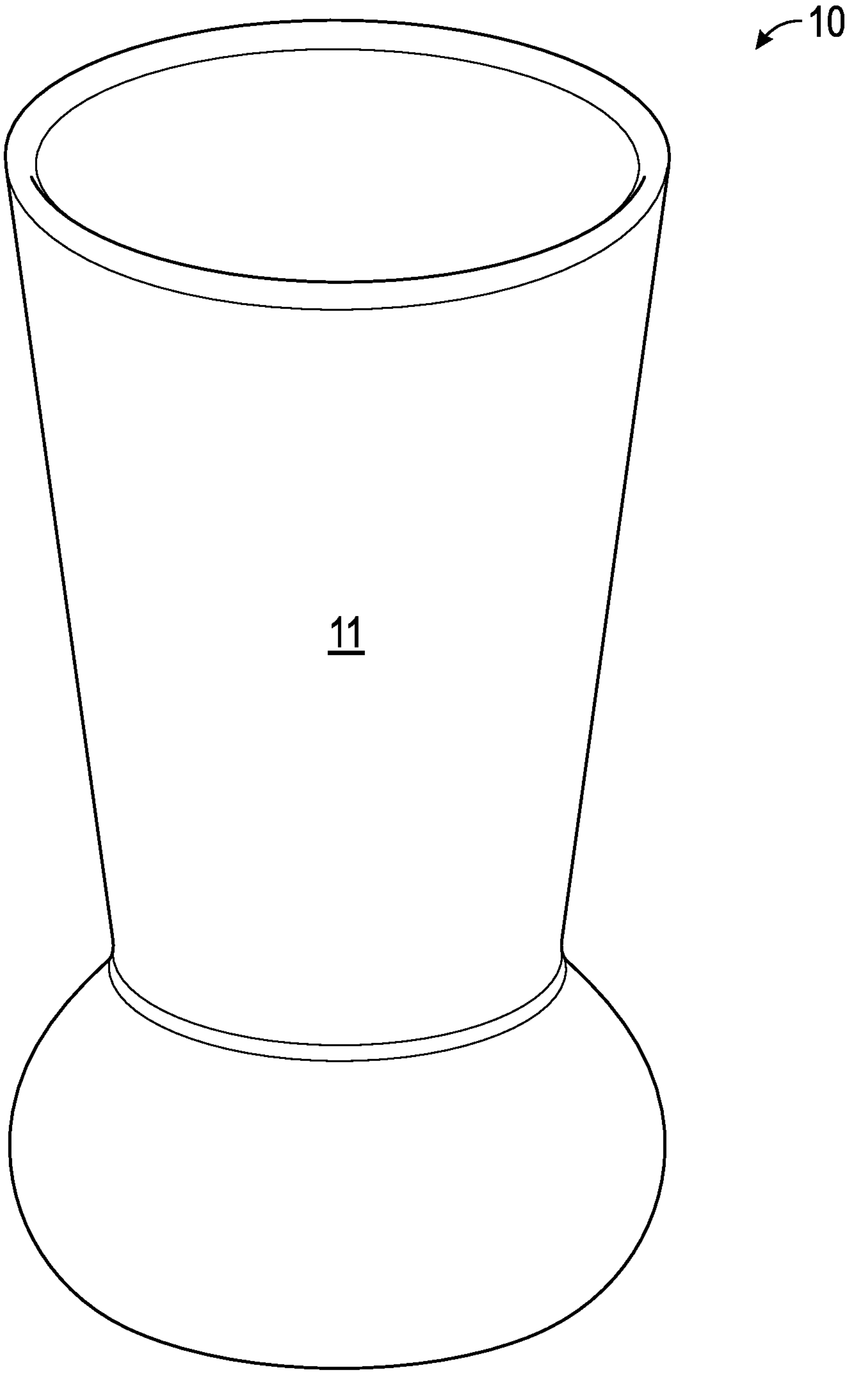
FIG. 1A is a drawing which illustrates a perspective view of a keepsake according to an embodiment of the present invention.
Figure 1B:
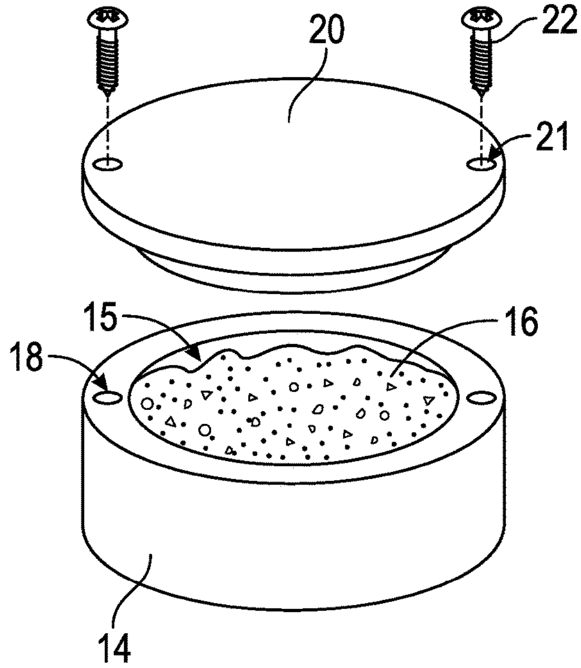
FIG. 1B is a drawing which illustrates a memento positioned within an inner container and with a lid positioned above the inner container.
Figure 2:
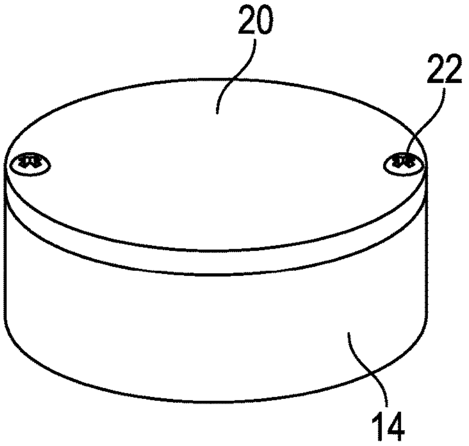
FIG. 2 is a drawing which illustrates an inner container with a lid disposed thereon and which is held in place with a plurality of fasteners.
Figure 3:
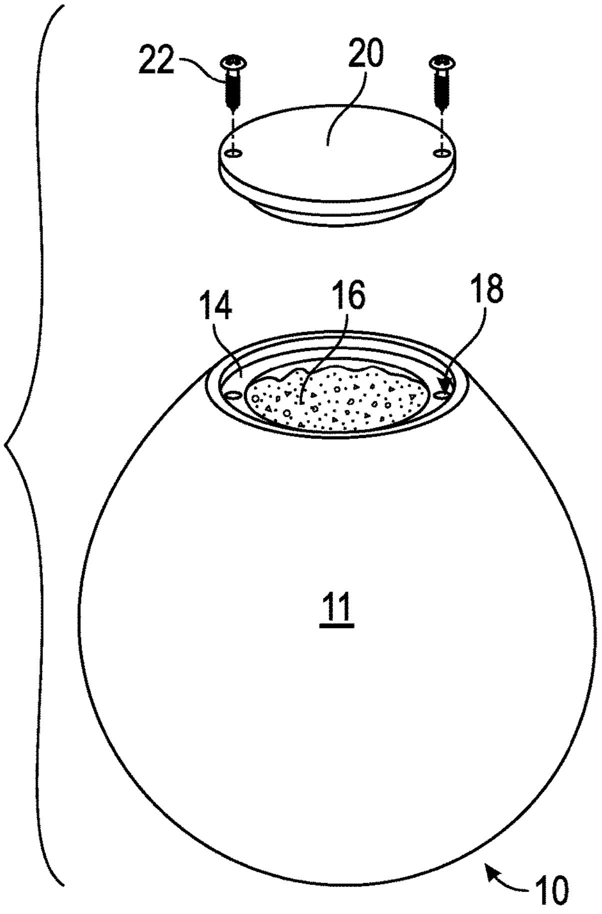
FIG. 3 is a drawing which illustrates a keepsake wherein an inner container is disposed within an outer body and wherein a lid is positioned above the inner container.
Figure 4:
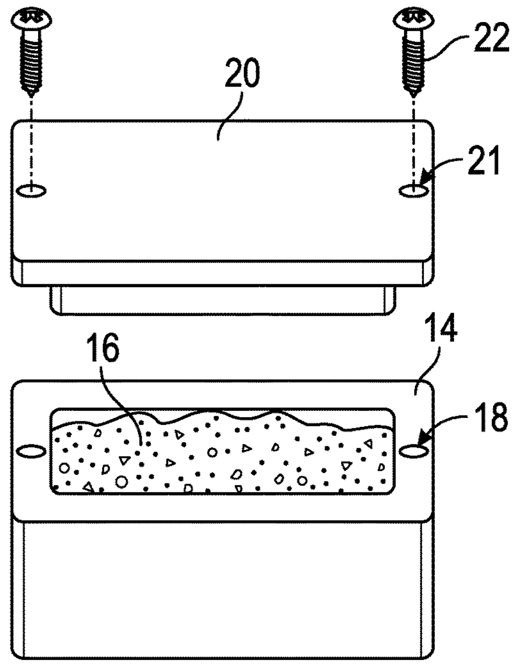
FIG. 4 is a drawing which illustrates a memento positioned within a non-cylindrical inner container and with a lid positioned above the inner container.
Figure 5:
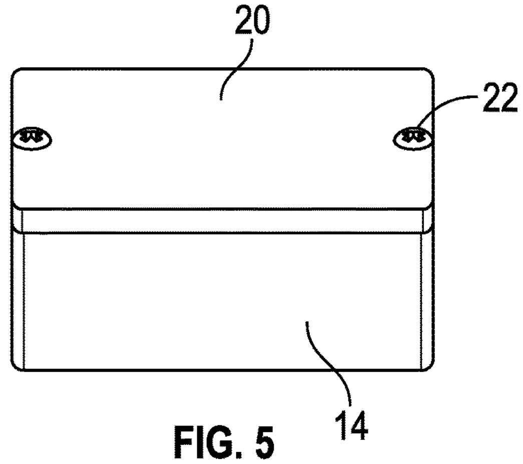
FIG. 5 is a drawing which illustrates a non-cylindrical inner container with a lid disposed thereon and which is held in place with a plurality of fasteners.
Figure 6:
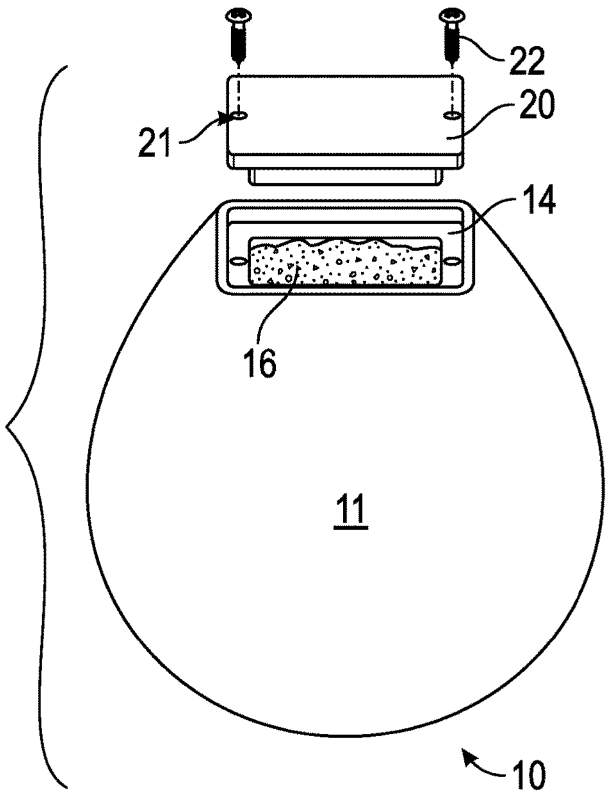
FIG. 6 is a drawing which illustrates a keepsake wherein a rectangular inner container is disposed within an outer body and wherein a lid is positioned above the inner container.
Figure 7:
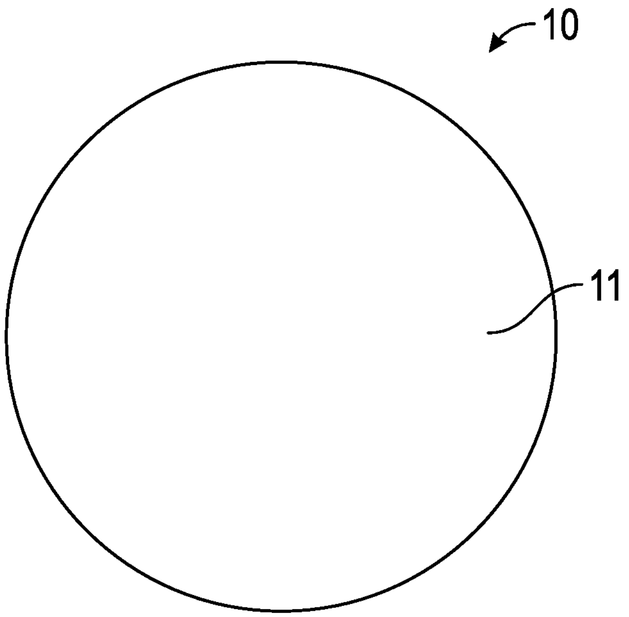
FIG. 7 is a drawing which illustrates a top view of a keepsake according to an embodiment of the present invention.
Figure 8:
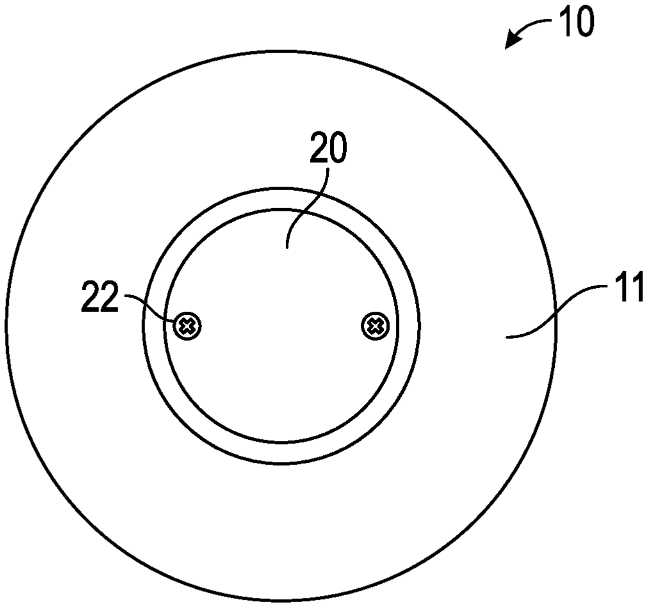
FIG. 8 is a drawing which illustrates a bottom view of a keepsake with a lid of an inner container visible.
Figure 9:
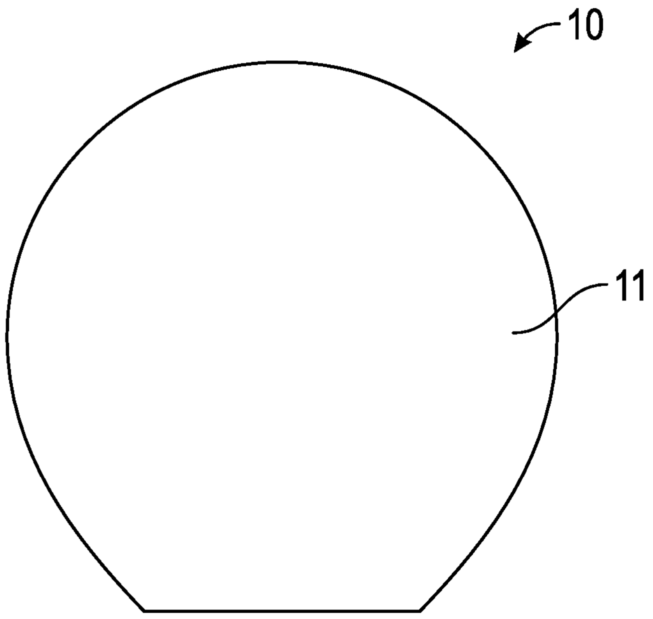
FIG. 9 is a drawing which illustrates a front view of a keepsake according to an embodiment of the present invention.
Figure 10:
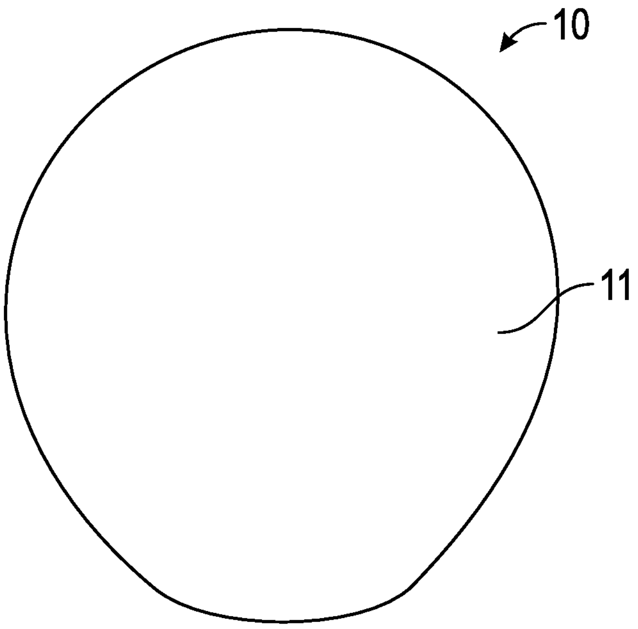
FIG. 10 is a drawing which illustrates an elevated perspective view of a keepsake according to an embodiment of the present invention.
Figure 11:
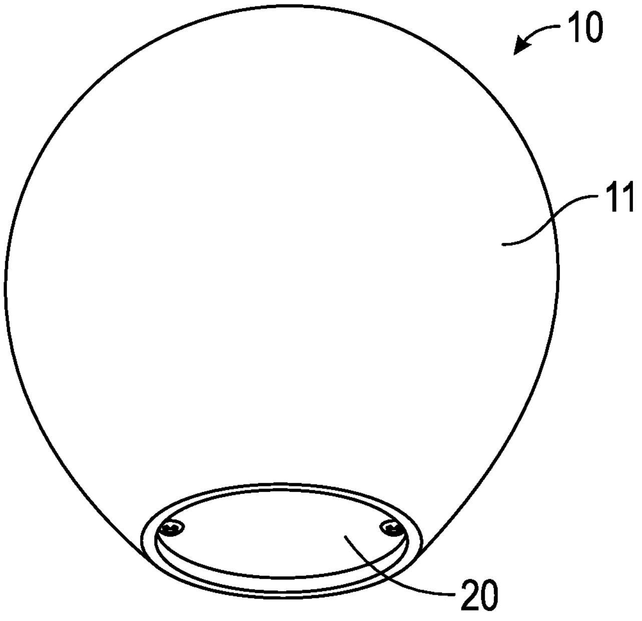
FIG. 11 is a drawing which illustrates a perspective view of a keepsake.

Referring now to the figures, keepsake 10 preferably includes outer body 11. Outer body can comprise any desirable shape, including but not limited to a vase, an orb, a paperweight, a cube, or any other desired shape or other decorative object. Outer body 11 preferably comprises opening 12 which is preferably sized to receive inner container 14. In one embodiment, opening 12 is preferably disposed or otherwise formed in a bottom of outer body 11 such that opening 12 is not visible when outer body 11 is placed in its intended resting position. Most preferably, the depth of opening 12 is at least as deep as a height of inner container 14 plus the thickness of lid 20, such that once lid 20 is secured to inner container 14 and the assembly thereof is disposed within opening 12, no portion of lid 20 or inner container 14 will project from outer body 11. In one embodiment, the depth of opening 12 is preferably at least about 5% greater than the total height of inner container 14 with its lid 20 disposed thereon. In one embodiment, the depth of opening 12 is preferably at least about 10% greater than the total height of inner container 14 with its lid 20 disposed thereon. Thus, for embodiments wherein opening 12 is disposed through the bottom surface of outer body 11, outer body 11 will still rest on its bottom surface when placed in its desired resting position.

Outer body 11 can be formed from any desirable material, including but not limited to wood, epoxy, glass, metal, plastic, resin, stone, combinations thereof and the like. In one embodiment, outer body 11 is preferably formed to have a decorative appearance. For example, wood can be carved and a resin disposed therein (and/or the resin can be disposed within any naturally-occurring voids of the wood) and allowed to cure and the wood/resin can then be shaped into outer body 11 and opening 12 disposed therein. Optionally, one or more other materials can be mixed into the resin—for example, glitter, pigments and/or other substances. Depending on the material and method of production, opening 12 can be formed into outer body 11 during the shaping of outer body 11, or can be formed into outer body 11 as a separate step (for example, by drilling opening 12 into outer body 11).

In one embodiment, memento 16 is preferably placed within inner container 14. In one embodiment, memento 16 can comprise cremains (cremated ashes of a person, pet or other animal), hair and/or personal effects of a deceased or living person or animal. Optionally, memento 16 can be placed into inner container 14 and lid 20 secured to inner container 14 by passing one or more fasteners 22, through openings 21 in lid 20 and securing the one or more fasteners 22 into a respective opening 18 which is disposed in inner container 14. Optionally, one or more fasteners 22 can comprise a screw or bolt or an interference fit pin. Optionally, lid 20 and inner container 14 can comprise threads which engage with one another such that lid 20 can be screwed onto inner container 14. Any other form of attachment can be used to secure lid 20 to inner container 14, including, but not limited to, for example, an interference fit, and/or securing lid 20 to inner container 14 with an adhesive. Thus, for such embodiments where fasteners 22 are not used, openings 21 and 18 are preferably not provided. Still further, depending on the type of fastener used, and/or the material from which inner container 14 and/or lid 20 are formed, openings 21 and/or 18 are optionally not provided—for example, if lid 20 and container 14 are formed from a plastic material, fastener 22 can comprise a screw which can be screwed directly through lid 20 and into inner container 14.

Optionally, inner container 14 can be formed from any desirable material, including but not limited to plastic, metal, ceramic, combinations thereof and the like. In one embodiment one or more openings 18 of inner container 14 can comprise threads formed therein such that a bolt or other threaded fastener can engage therewith.

Figure 28A:
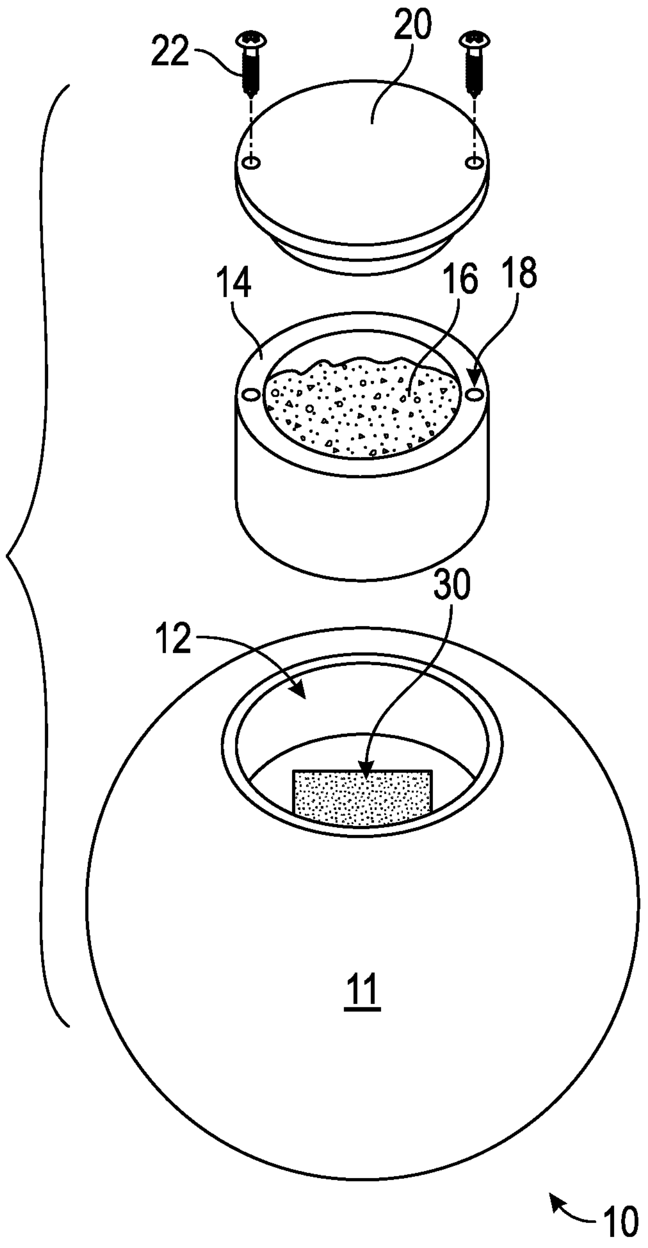
FIG. 28A is a drawing which illustrates an embodiment wherein adhesive is applied between an exterior bottom surface of an inner container and a bottom surface of an opening in the outer body.
Figure 28B:
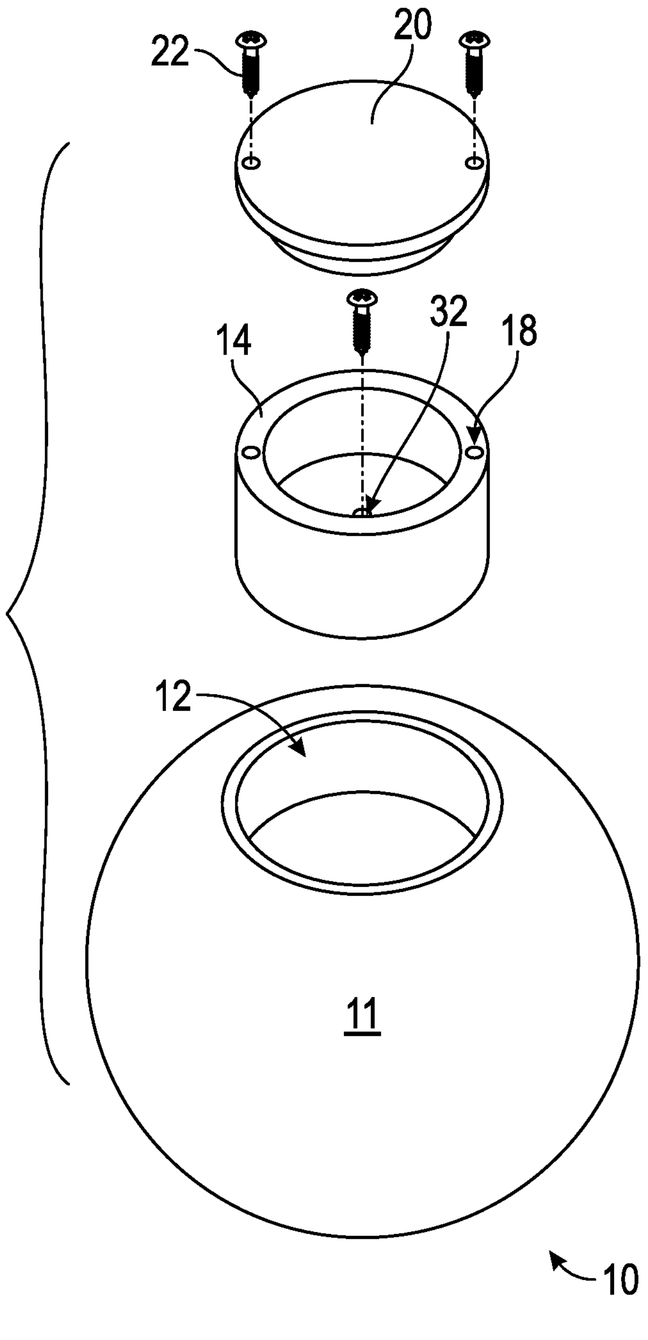
FIG. 28B is a drawing which illustrates an embodiment wherein a hole is provided in a bottom of an inner container which can be provided to facilitate air to escape from between the inner container and the outer body while inner container is being inserted therein.

In one embodiment, inner container 14 can be secured within opening 12 of outer body 11 using adhesive 30 (see FIG. 28A) which is preferably disposed between a bottom surface of inner container 14 and a bottom surface of opening 12. Optionally, inner container 14 can be secured within opening 12 of outer body 11 with fastener 22 (see FIG. 28B). In either or both of these embodiments, inner container 14 can comprise opening 32 disposed in a bottom thereof. Opening 32 can facilitate not only attachment of inner container 14 within opening 12 but can also facilitate ease of insertion of inner container 14 within opening 12. For example, when the tolerance of fit between the sidewall of inner container 14 and opening 12 is close, air entrapped therein resists seating of inner container 14. As such, opening 32 permits air to escape while inner container 14 is being placed in opening 12. Further, when adhesive 30 is provided, adhesive 30 can squeeze up through opening 32 before hardening, thus providing better securement for inner container 14.

In one embodiment, outer body 11 is preferably inverted such that opening 12 is up on top, then, inner container 14 is secured within opening 12. This can include for example, either an interference fit, attachment with one or more fasteners, and/or attachment with an adhesive (which if provided is preferably disposed within opening 12 before inner container 14 is disposed therein). Then, memento 16 is preferably placed into opening 15 of inner container 14. Lid 20 is then preferably placed and secured onto inner container 14 (which can include for example, by using one or more fasteners, screwing lid 20 onto inner container 14, attaching lid 20 to inner container 14 via an adhesive and/or screwing lid 20 onto inner container 14). When adhesive 30 is used to secure inner container 14 within opening 12, in one embodiment, adhesive 30 is preferably allowed to harden or otherwise become dry before memento 16 is placed into inner container 14.

Figure 12:
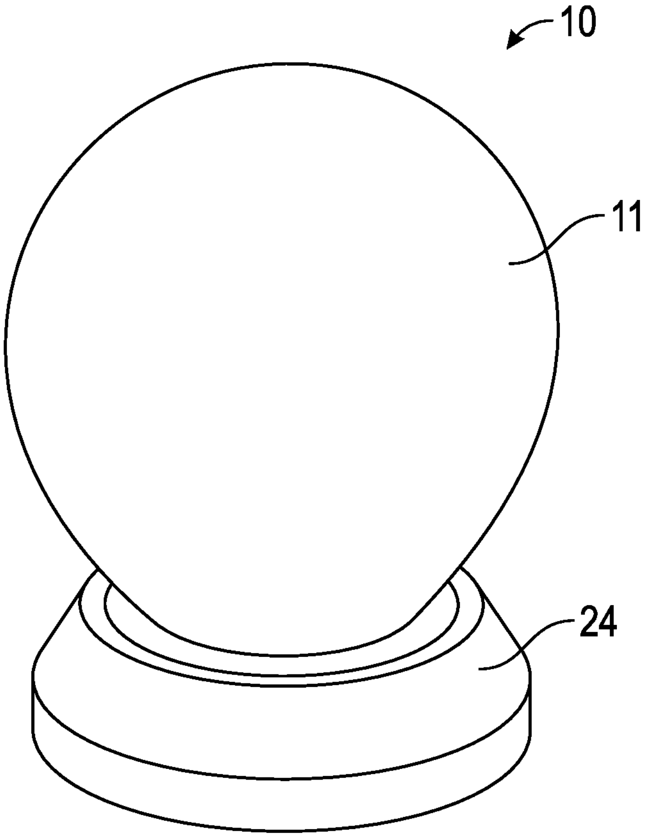
FIG. 12 is a drawing which illustrates a keepsake disposed on a stand according to an embodiment of the present invention.
Figure 13:
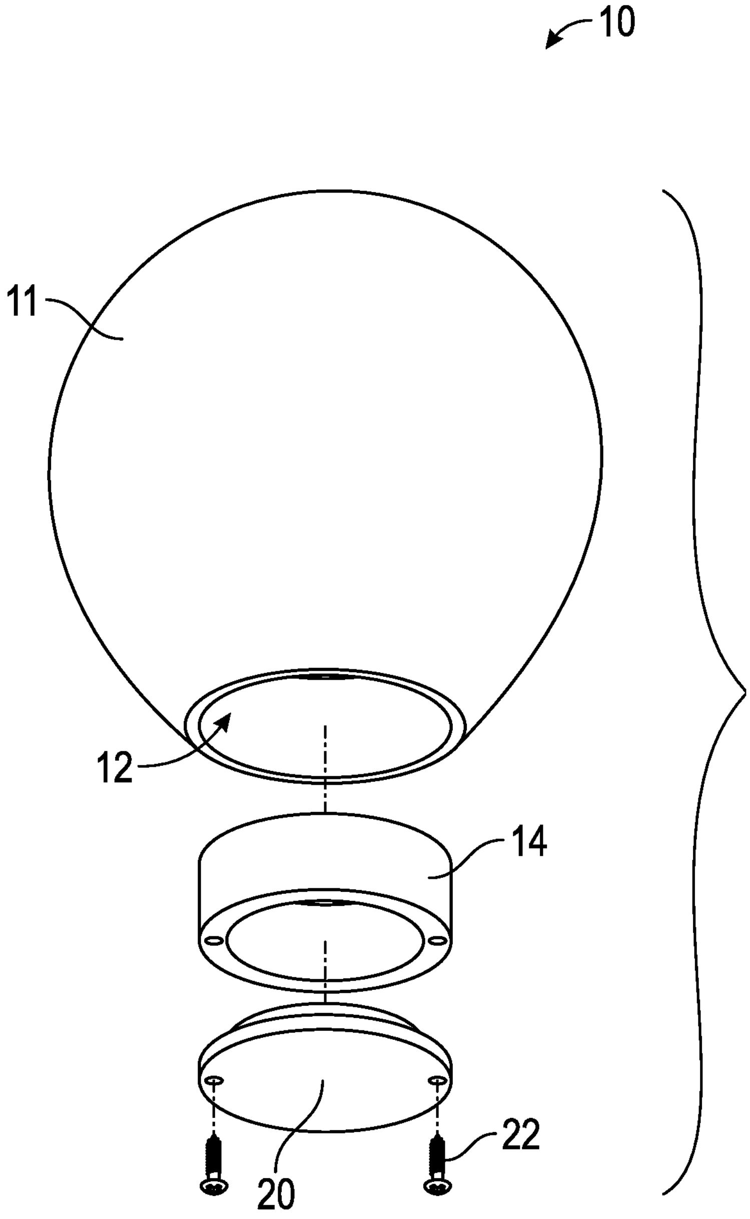
FIGS. 13 and 14 are exploded perspective views of a keepsake without a memento positioned therein.
Figure 14:
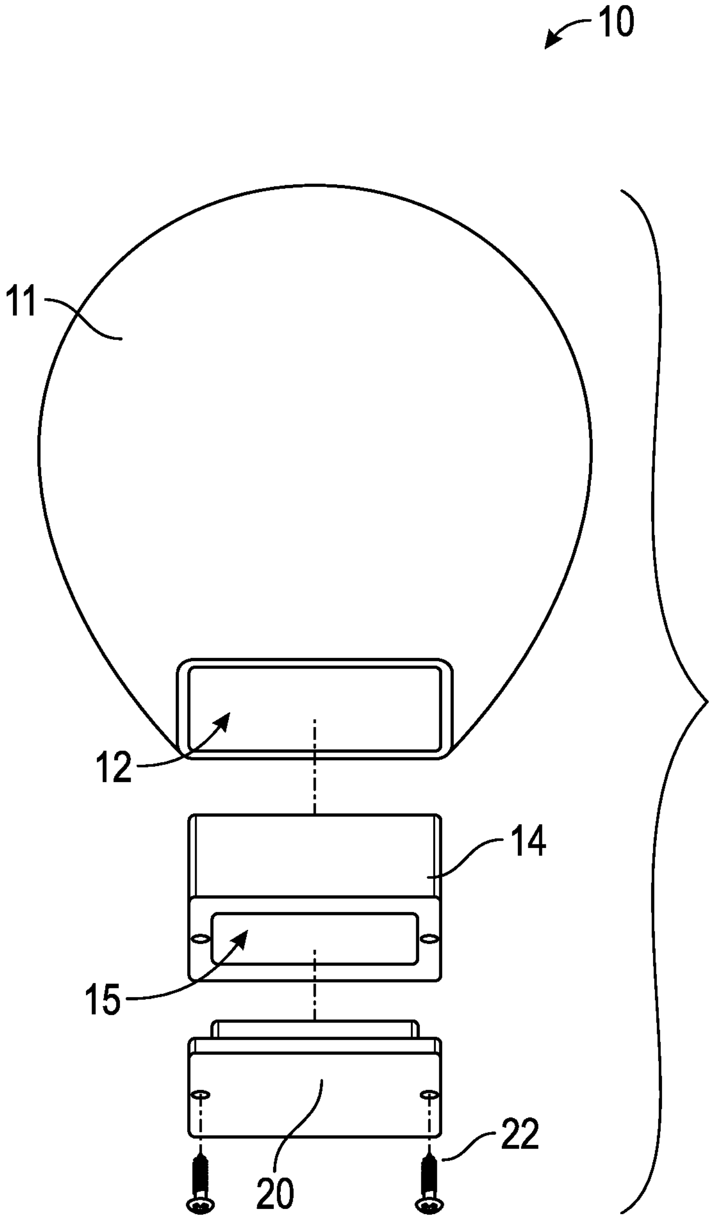
Figure 15:
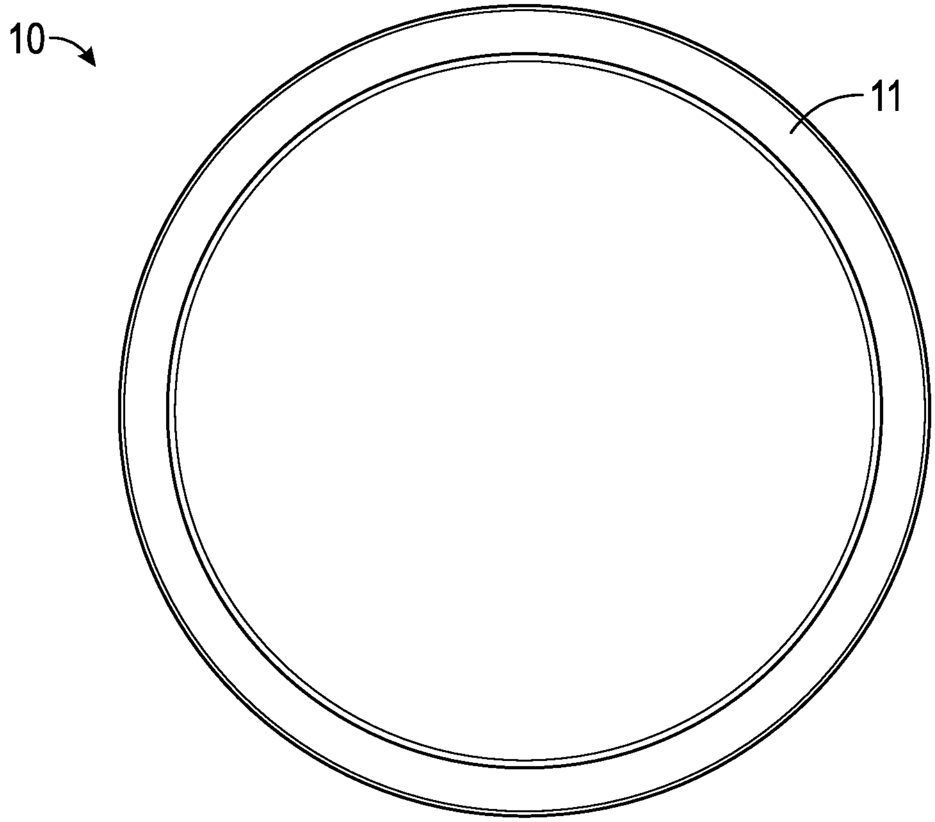
FIGS. 15, 16, and 17 respectively illustrate a top, bottom and front view of a keepsake according to an embodiment of the present invention.
Figure 16:
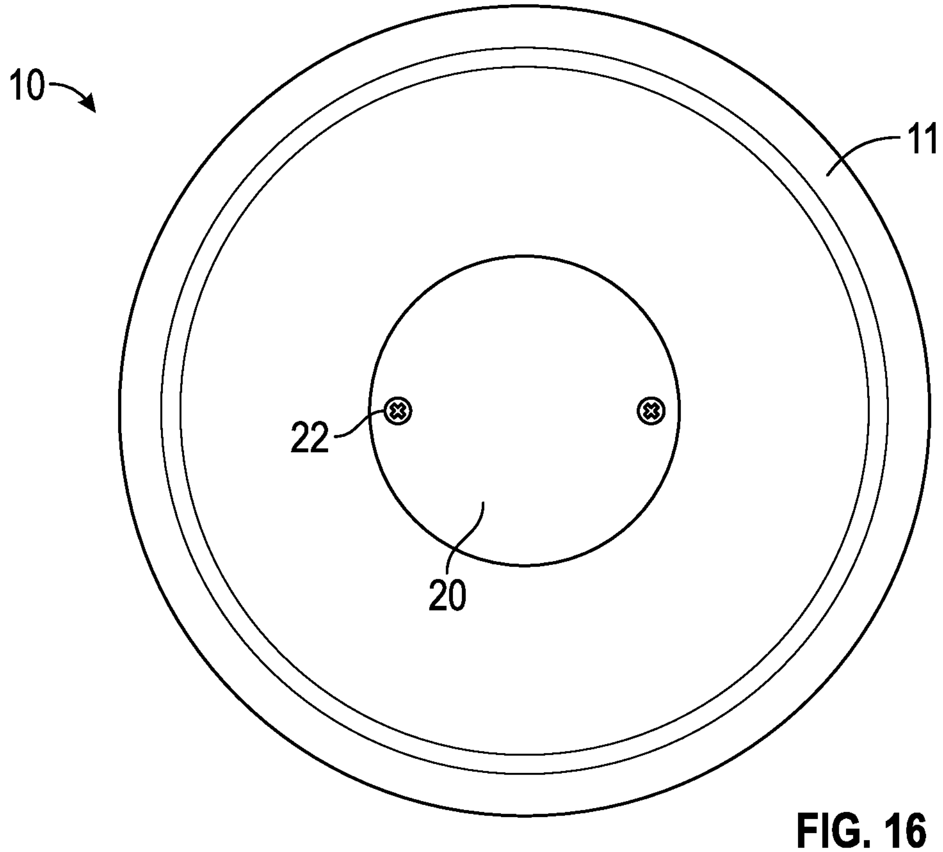
Figure 17:
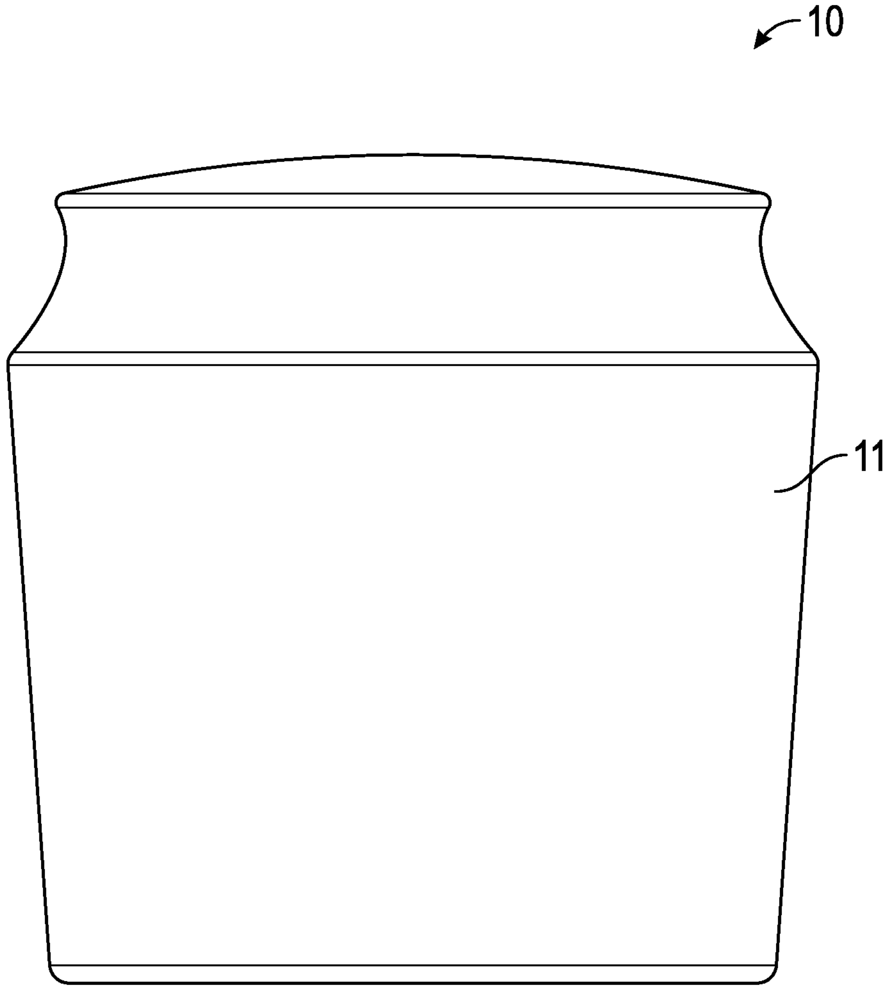
Figure 18:
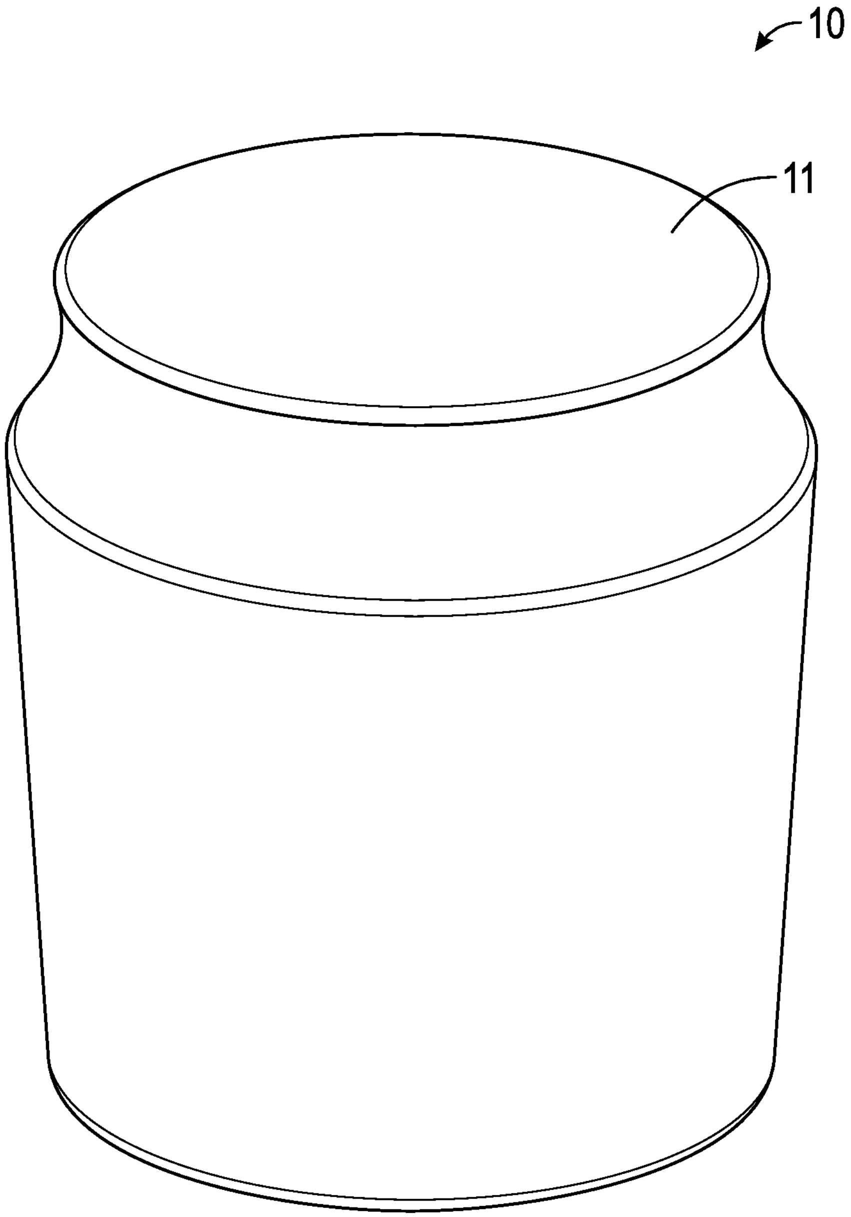
FIGS. 18 and 19 respectively illustrate perspective views of a keepsake according to an embodiment of the present invention.
Figure 19:
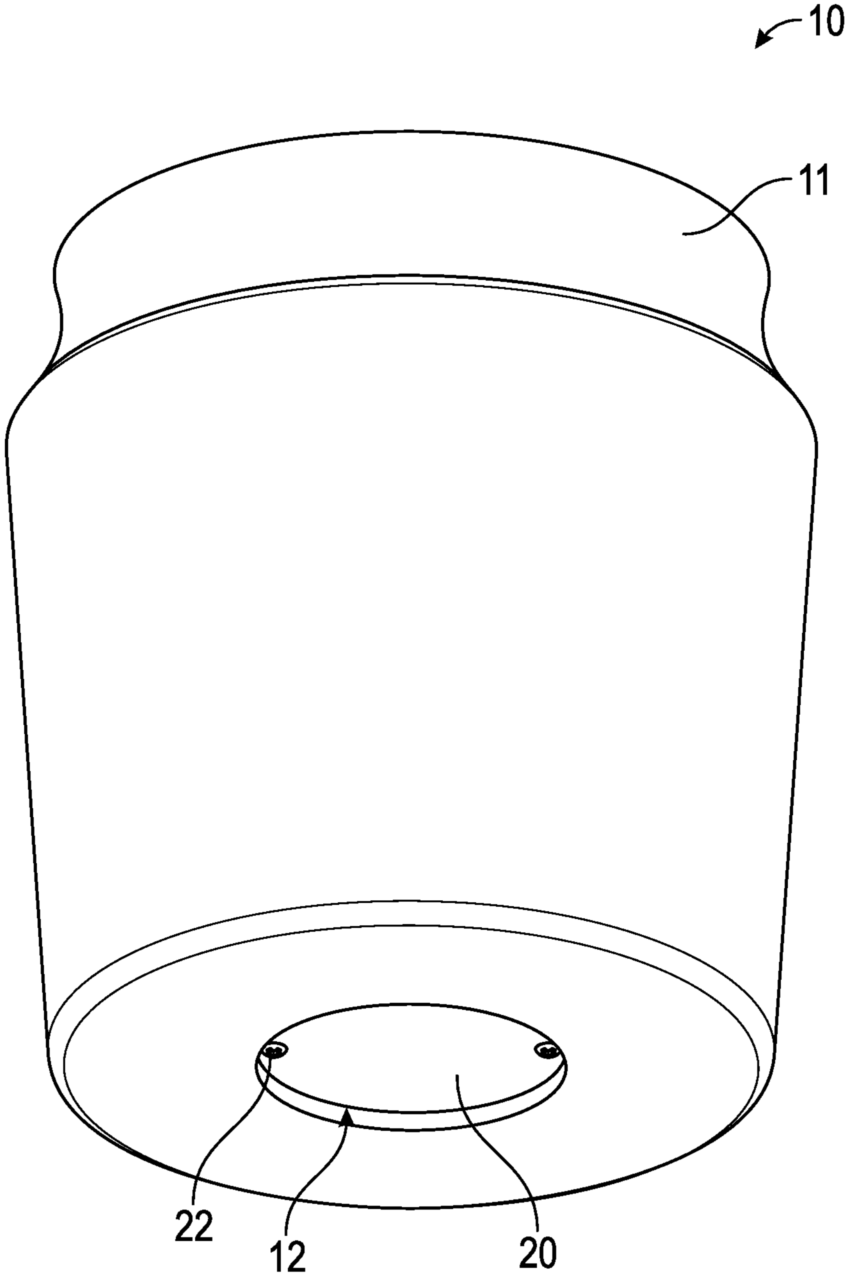
Figure 20:
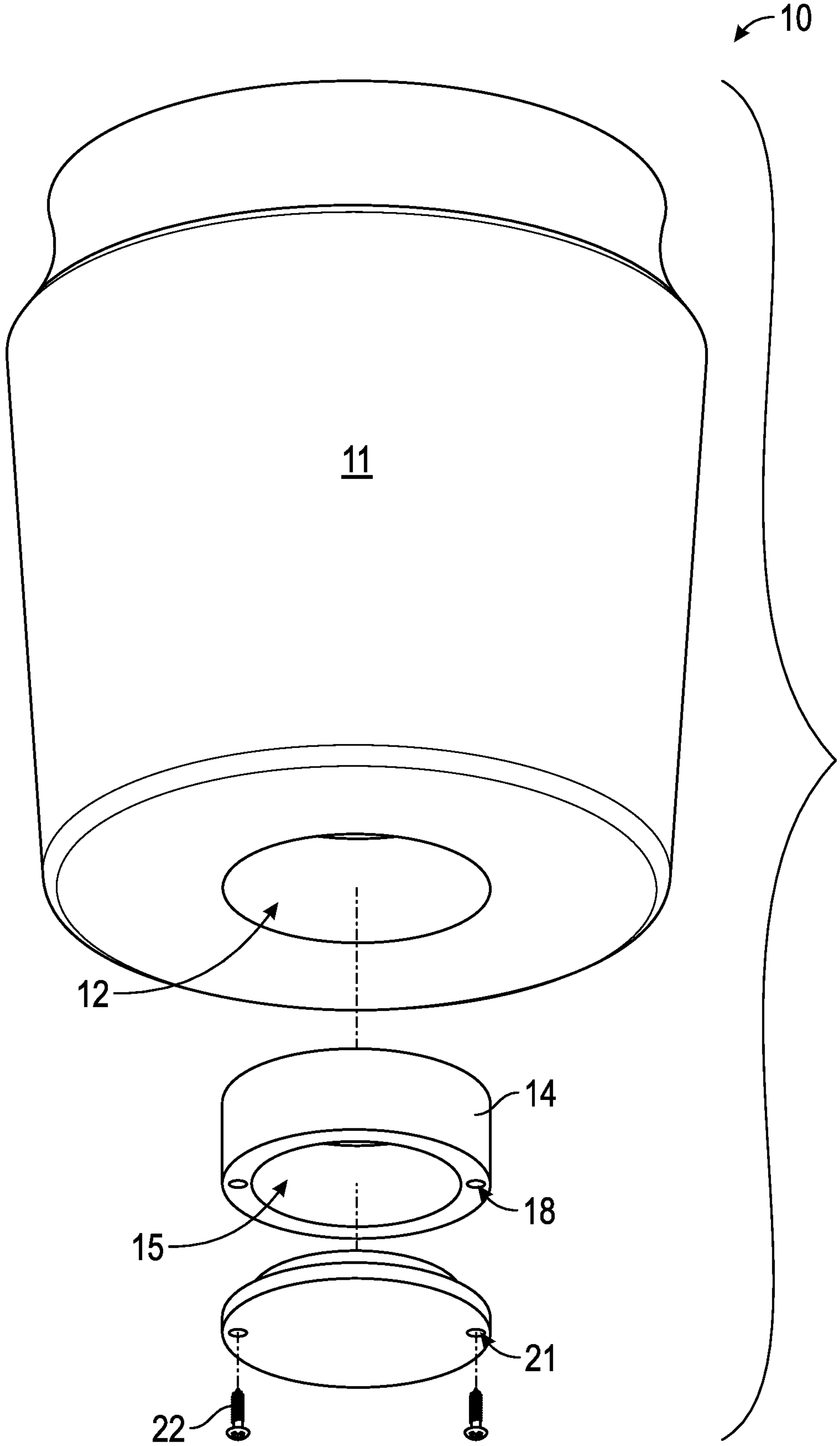
FIGS. 20 and 21 respectively illustrate exploded views of a keepsake without a memento positioned therein according to an embodiment of the present invention.
Figure 21:
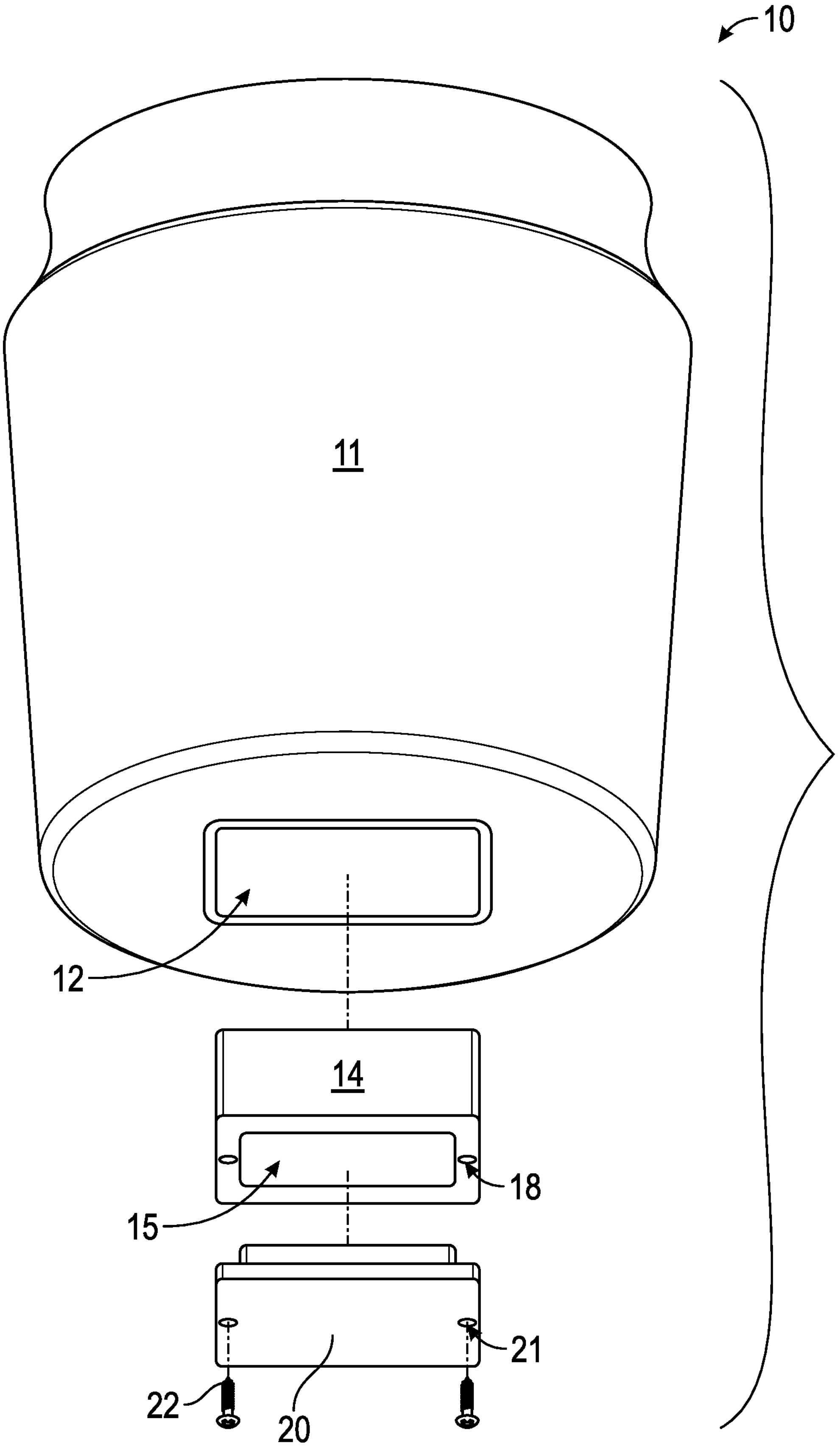
Figure 22:
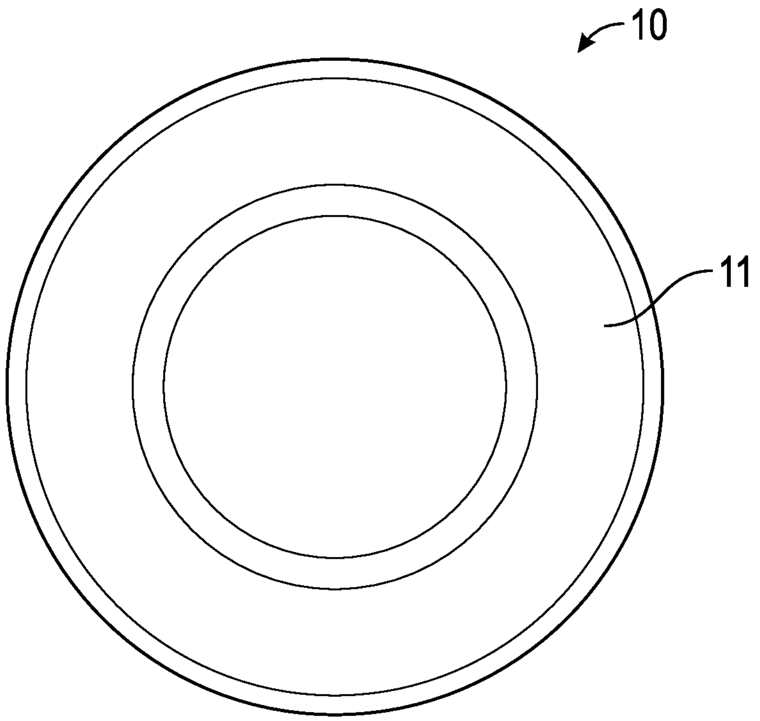
FIGS. 22, 23, and 24 respectively illustrate a top, bottom and front view of a keepsake according to an embodiment of the present invention.
Figure 23:
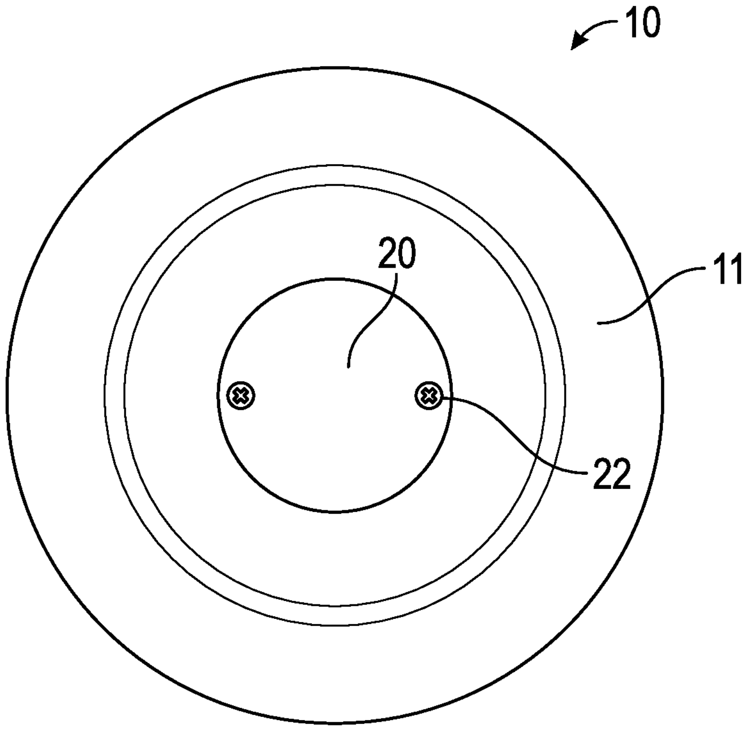
Figure 24:
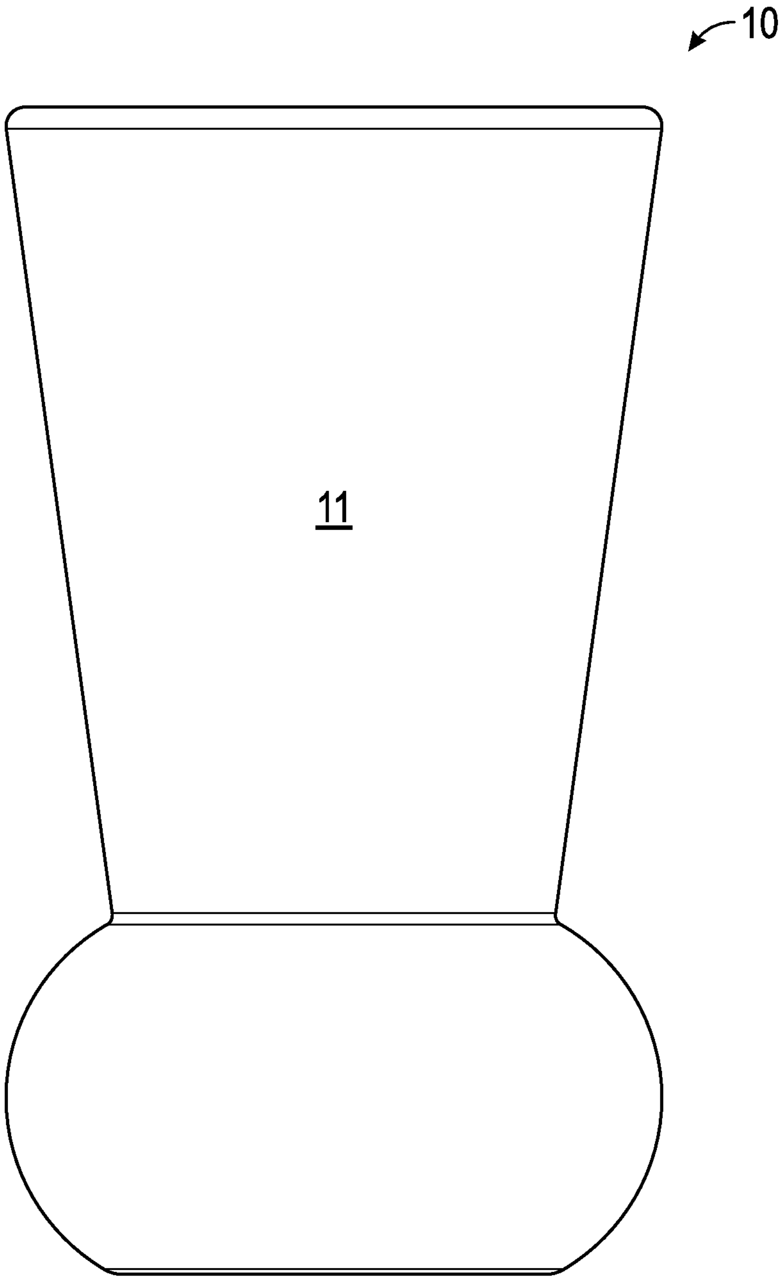
Figure 25:
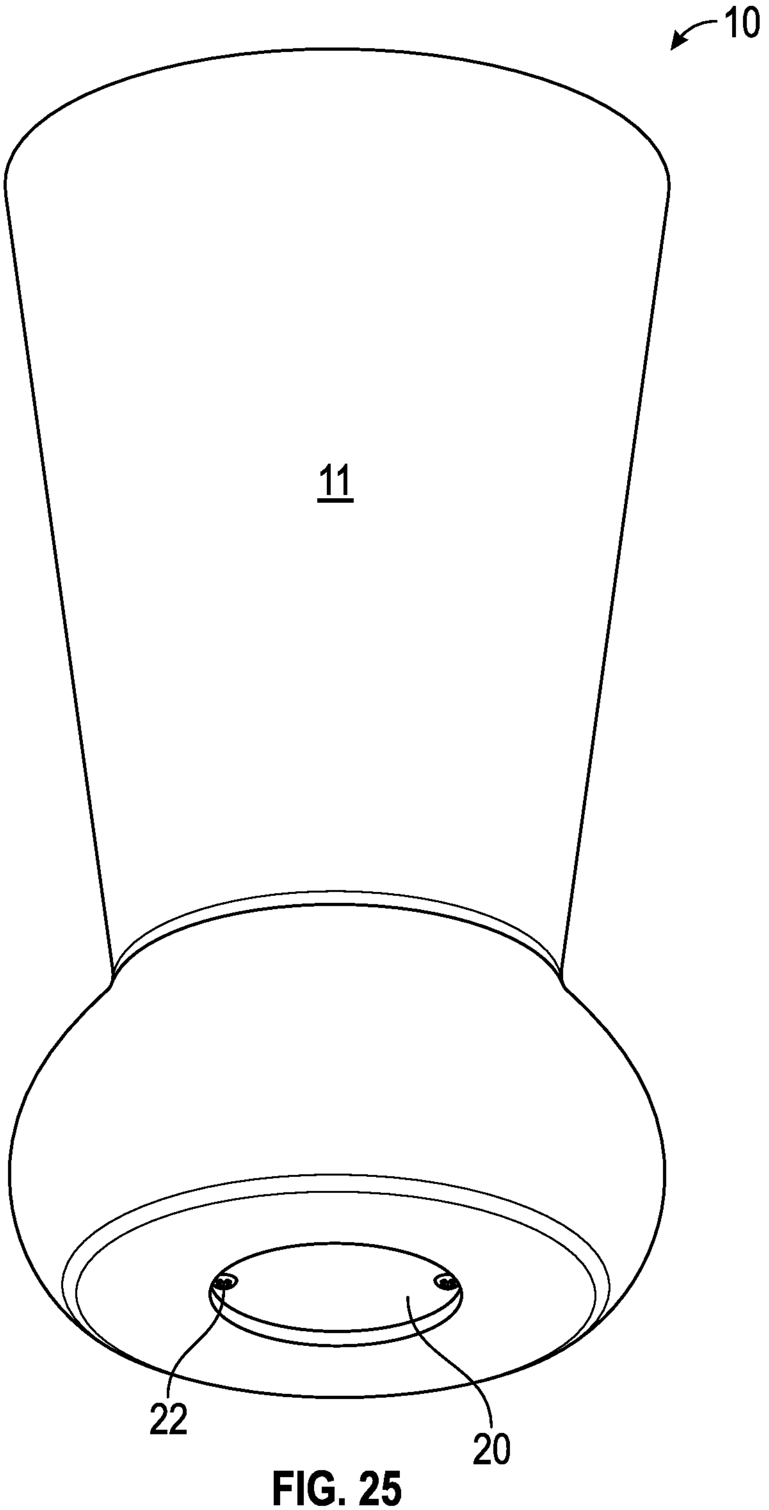
FIG. 25 illustrates a perspective view of a keepsake according to an embodiment of the present invention.
Figure 26:
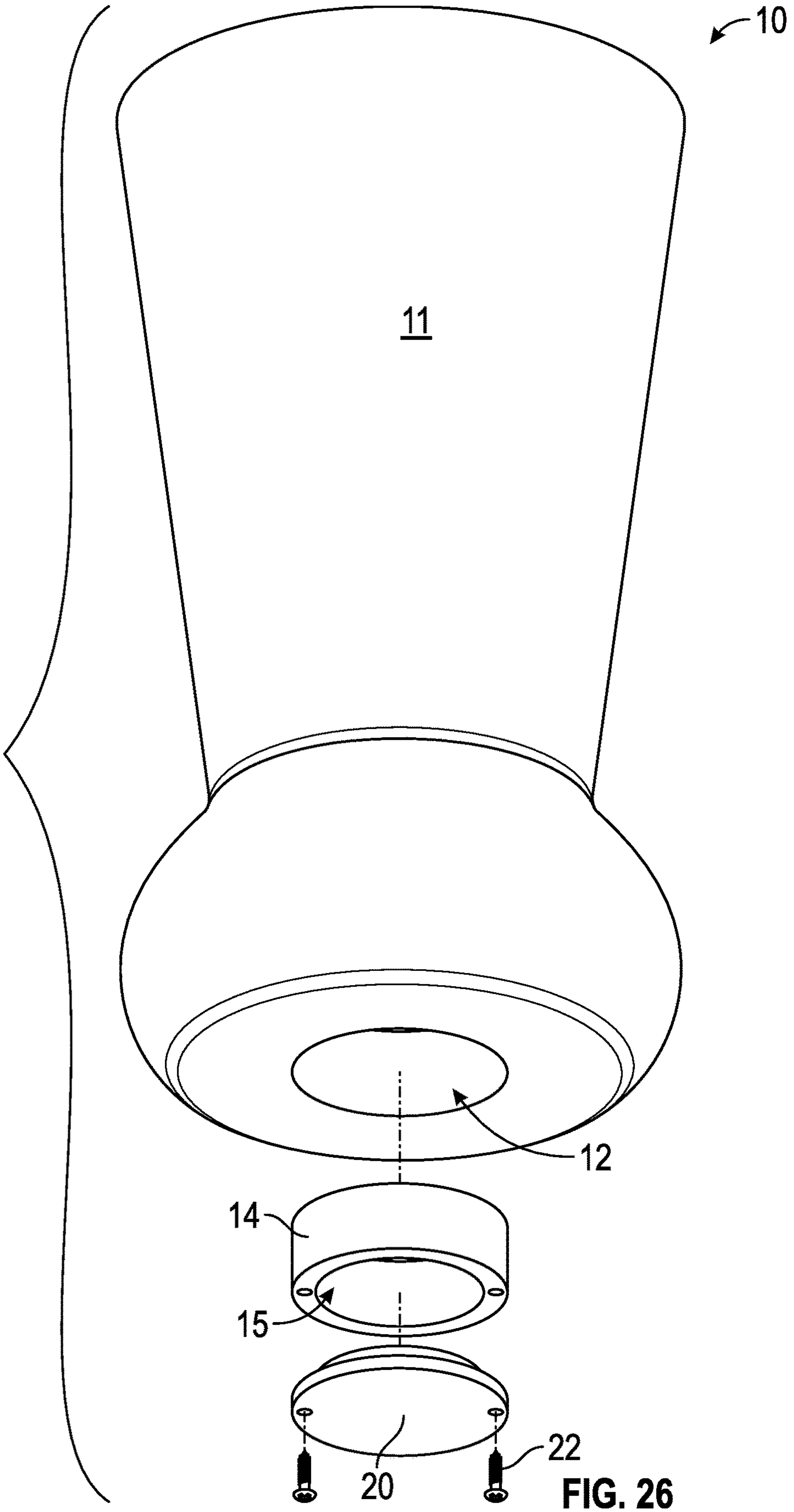
FIGS. 26 and 27 respectively illustrate exploded views of a keepsake without a memento positioned therein according to an embodiment of the present invention.
Figure 27:
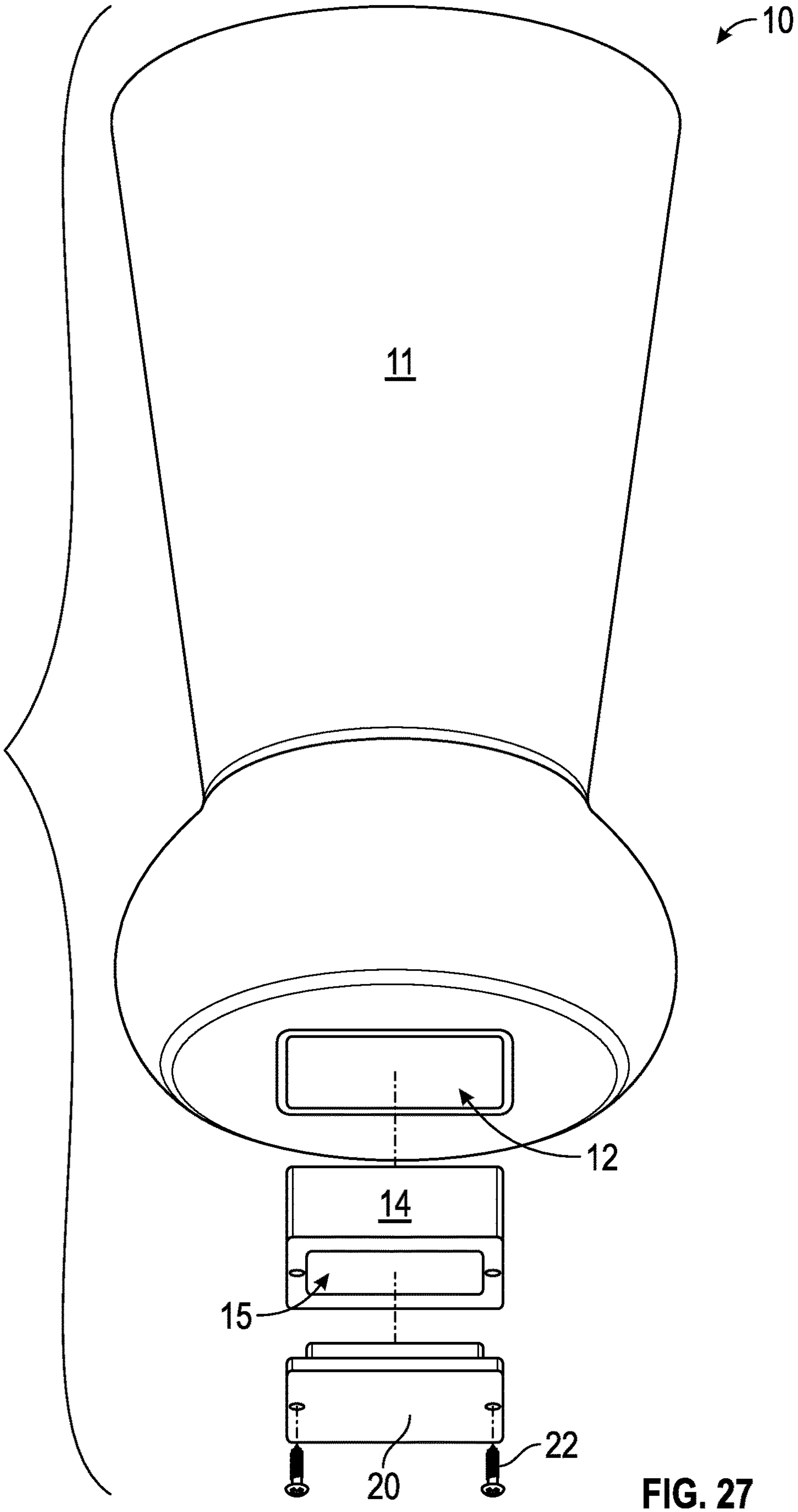

In one embodiment, keepsake 10 can be made to look like any other object such that a casual observer does not readily know that keepsake 10 holds memento 16 within it. As best illustrated in FIG. 12, in one embodiment, base 24 can be provided to support outer body 11.

In one embodiment, inner container 14 is preferably made sufficiently small that it can fit within an everyday object. As such, in one embodiment, opening 15 of inner container 14 has a volume which is not adequate to hold the entirety of cremains of an individual. In one embodiment, inner container 14 preferably comprises a volume of less than about 250 milliliters ("ml"). In one embodiment, inner container 14 preferably comprises a volume of less than about 100 ml. In one embodiment, keepsake 10 does not comprise a lid disposed on a top of the keepsake which opens to inner container 14. In one embodiment, to view inner container 14 or lid 20 of inner container 14, once assembled and with a memento placed therein, a user must invert and look on the bottom of inner container 14. In one embodiment, inner container 14 is preferably secured within opening 12 of outer body 11 such that once memento 16 is placed in inner container 14, inner container 14 cannot simply be lifted and removed from outer body 11. In one embodiment, neither a second lid nor any other covering is provided to further cover inner container 14 and its lid 20, thus, once keepsake 10 is inverted, lid 20 is directly visible. In one embodiment, a gasket is not disposed between inner container 14 and outer body 11. In one embodiment, keepsake 10 is not an urn because it cannot store all of the cremains of an individual.

In one embodiment, when fully assembled, memento 16 does not make direct contact with any portion of outer body 11.

The terms, "a", "an", "the", and "said" mean "one or more" unless context explicitly dictates otherwise. Note that in the specification and claims, "about", "approximately", and/or "substantially" means within twenty percent (20%) of the amount, value, or condition given.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and this application is intended to cover, in the appended claims, all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A method of storing cremains, the method comprising:
obtaining the cremains;
providing a decorative object comprising a bottom which faces downward when the decorative object is placed in its intended resting orientation;
disposing the cremains within a first container;
securing a lid onto the first container;
disposing the first container at least partially into a recess formed into the bottom of the decorative object;
placing the first container into the recess such that the lid of the first container is observable when the decorative object is positioned such that a user can observe the bottom of the decorative object; and
securing the first container within the recess with an adhesive.

2. The method of claim 1 wherein the decorative object is formed from a mass of wood and hardened epoxy that has been shaped by turning the mass on a lathe.

3. The method of claim 1 wherein the lid is secured to the first container via one or more fasteners.

4. The method of claim 1 wherein the lid is secured to the first container by passing at least one fastener through an opening disposed in the lid and disposing an end portion of the fastener into an opening formed in the first container.

5. The method of claim 1 further comprising placing the decorative object onto a base after the cremains have been disposed within the first container and after the first container, with the lid, has been disposed into the recess of the decorative object.

6. The method of claim 1 wherein the recess and the first container each comprise a substantially circular cross-sectional shape.

7. The method of claim 1 wherein the recess and the first container each comprise a substantially rectangular cross-sectional shape.

8. The method of claim 1 wherein disposing the first container into the recess formed into the bottom of the decorative object comprises disposing the first container into the recess such that the first container and the lid thereof are recessed with respect to the bottom of the decorative object such that when the decorative object is placed onto a flat surface, the bottom of the decorative object contacts the flat surface and no portion of the first container, including its lid, contacts the flat surface.

9. The method of claim 1 wherein securing the first container within the recess with the adhesive comprises disposing a liquid adhesive within the recess and forcing the first container into the recess while allowing some of the adhesive to escape through an opening that is formed into a bottom of the first container.

10. A method of storing cremains, the method comprising:
obtaining the cremains;
providing a decorative object comprising a bottom which faces downward when the decorative object is placed in its intended resting orientation;
disposing the cremains within a first container;
securing a lid onto the first container;
disposing the first container at least partially into a recess formed into the bottom of the decorative object;
securing the first container within the recess with a liquid adhesive; and
disposing the liquid adhesive within the recess and forcing the first container into the recess while allowing some of the liquid adhesive to escape through an opening that is formed into a bottom of the first container.

11. The method of claim 10 wherein the decorative object is formed from a mass of wood and hardened epoxy that has been shaped by turning the mass on a lathe.

12. The method of claim 10 wherein the lid is secured to the first container via one or more fasteners.

13. The method of claim 10 wherein the lid is secured to the first container by passing at least one fastener through an opening disposed in the lid and disposing an end portion of the fastener into an opening formed in the first container.

14. The method of claim 10 wherein disposing the first container at least partially into the recess formed into the bottom of the decorative object comprises placing the first container into the recess such that the lid of the first container is observable when the decorative object is positioned such that a user can observe the bottom of the decorative object.

15. The method of claim 10 further comprising placing the decorative object onto a base after the cremains have been disposed within the first container and after the first container, with the lid, has been disposed into the recess of the decorative object.

16. The method of claim 10 wherein the recess and the first container each comprise a substantially circular cross-sectional shape.

17. The method of claim 10 wherein the recess and the first container each comprise a substantially rectangular cross-sectional shape.

18. The method of claim 10 wherein disposing the first container into the recess formed into the bottom of the decorative object comprises disposing the first container into the recess such that the first container and the lid thereof are recessed with respect to the bottom of the decorative object such that when the decorative object is placed onto a flat surface, the bottom of the decorative object contacts the flat surface and no portion of the first container, including its lid, contacts the flat surface.

* * * * *